United States Patent
Gulsun et al.

(10) Patent No.: US 10,210,612 B2
(45) Date of Patent: *Feb. 19, 2019

(54) METHOD AND SYSTEM FOR MACHINE LEARNING BASED ESTIMATION OF ANISOTROPIC VESSEL ORIENTATION TENSOR

(71) Applicant: Siemens Healthcare GmbH, Erlangen (DE)

(72) Inventors: Mehmet Akif Gulsun, Lawrenceville, NJ (US); Yefeng Zheng, Princeton Junction, NJ (US); Saikiran Rapaka, Pennington, NJ (US); Gareth Funka-Lea, Cranbury, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 79 days.

This patent is subject to a terminal disclaimer.

(21) Appl. No.: 15/446,409

(22) Filed: Mar. 1, 2017

(65) Prior Publication Data

US 2017/0262981 A1 Sep. 14, 2017

Related U.S. Application Data

(60) Provisional application No. 62/306,434, filed on Mar. 10, 2016, provisional application No. 62/306,459, filed on Mar. 10, 2016.

(51) Int. Cl.
*G06K 9/00* (2006.01)
*A61B 5/05* (2006.01)
*G06T 7/00* (2017.01)
*G06K 9/62* (2006.01)

(52) U.S. Cl.
CPC .......... *G06T 7/0012* (2013.01); *G06K 9/6256* (2013.01); *G06K 9/6282* (2013.01); *G06K 2209/05* (2013.01); *G06T 2207/10081* (2013.01); *G06T 2207/20081* (2013.01); *G06T 2207/30101* (2013.01)

(58) Field of Classification Search
USPC ....... 382/100, 103, 107, 128–134, 162, 168, 382/173, 181, 190, 199, 224, 232, 254, 382/274, 276, 305; 600/408; 378/4, 21
See application file for complete search history.

(56) References Cited

U.S. PATENT DOCUMENTS 7,916,919 B2   3/2011   Zheng et al.
7,953,266 B2 *  5/2011   Gulsun ............... G06K 9/4638
                                                    382/131
7,990,379 B2   8/2011   Aharon et al.
(Continued)

*Primary Examiner* — Seyed H Azarian

(57) ABSTRACT

A method and apparatus for machine learning based detection of vessel orientation tensors of a target vessel from a medical image is disclosed. For each of a plurality of voxels in a medical image, such as a computed tomography angiography (CTA), features are extracted from sampling patches oriented to each of a plurality of discrete orientations in the medical image. A classification score is calculated for each of the plurality of discrete orientations at each voxel based on the features extracted from the sampling patches oriented to each of the plurality of discrete orientations using a trained vessel orientation tensor classifier. A vessel orientation tensor at each voxel is calculated based on the classification scores of the plurality of discrete orientations at that voxel.

28 Claims, 13 Drawing Sheets

(56) References Cited

U.S. PATENT DOCUMENTS

| | | | |
|---|---|---|---|
| 7,993,274 B2 * | 8/2011 | Pruvot | A61B 8/12 382/131 |
| 8,488,852 B2 | 7/2013 | Gupta et al. | |
| 8,582,854 B2 * | 11/2013 | Zhang | G06K 9/00 382/130 |
| 8,675,943 B2 | 3/2014 | Zheng et al. | |
| 9,129,417 B2 * | 9/2015 | Zheng | G06T 7/66 |
| 2006/0050941 A1 | 3/2006 | Middleton et al. | |
| 2010/0076296 A1 | 3/2010 | Mittal et al. | |
| 2010/0239148 A1 | 9/2010 | Zheng et al. | |
| 2011/0013819 A1 * | 1/2011 | Raundahl | G06K 9/527 382/132 |
| 2013/0216110 A1 | 8/2013 | Zheng et al. | |
| 2015/0235360 A1 | 8/2015 | Zheng et al. | |
| 2015/0238148 A1 * | 8/2015 | Georgescu | A61B 5/7267 600/408 |

* cited by examiner 300 310 320

400              410

900

910

920

1000

1010

1200

1210

METHOD AND SYSTEM FOR MACHINE LEARNING BASED ESTIMATION OF ANISOTROPIC VESSEL ORIENTATION TENSOR

This application claims the benefit of U.S. Provisional Application No. 62/306,459, filed Mar. 10, 2016, and U.S. Provisional Application No. 62/306,434, filed Mar. 10, 2016, the disclosures of which are herein incorporated by reference.

BACKGROUND OF THE INVENTION

The present invention relates to machine learning based detection of vascular structures in medical images, and more particularly, to machine learning based detection of vessels and estimation of anisotropic vessel orientation tensors in medical images.

Automatic detection and segmentation of coronary arteries in Computed Tomography Angiography (CTA) facilitates the diagnosis, treatment, and monitoring of coronary artery diseases. Most existing coronary artery detection techniques use minimal path extraction from one or multiple seeds, operating on hand crafted cost metrics such as vesselness or medialness filters. However, these techniques do not exploit the rich image context information in CTA images and are prone to errors due to imaging artifacts, nearby touching structures such as heart chambers and coronary veins, and variation in image contrast.

An important step in coronary artery segmentation is to extract a curve along the center of the coronary artery referred to as a centerline. A centerline representation is important for the visualization of the artery through a curved planar reformatting. A centerline is also useful to support lumen segmentation methods for quantitative assessments, such as stenosis grading or CT based Fractional Flow Reserve (FFR) measurements. Coronary arteries constitute only a small portion of a large CTA volume because of their thin tubular geometry. Their centerline extraction is not an easy task due to nearby heart structures and coronary veins. Most existing coronary centerline extraction methods compute centerline paths by minimizing a vesselness or medialness cost metric, such as a Hessian based vesselness, flux based medialness, or other tubularity measure, along the paths. However, these methods are very sensitive to the underlying cost metric causing them to easily make shortcuts through nearby non-coronary structures if the cost is high along the true path, which is often the case for coronary arteries due to pathologies, large contrast variations, complex bifurcations, or imaging artifacts. In addition, because of their cost accumulative property, these methods commonly favor shorter paths causing shortcuts, particularly when tracing long curvy branches.

BRIEF SUMMARY OF THE INVENTION

The present invention provides methods and systems for machine learning based detection of vessels in medical images and machine learning based estimation of anisotropic vessel orientation tensors in medical images. Embodiments of the present invention utilize a machine learning based classification approach for predicting anisotropic orientation tensors of a target vessel, such as a coronary artery. At a given image voxel, the machine learning based classification computes a likelihood of a particular direction being aligned with the true vessel orientation.

In one embodiment of the present invention, for each of a plurality of voxels in a medical image, features are extracted from sampling patches oriented to each of a plurality of discrete orientations. A classification score is calculated for each of the plurality of discrete orientations at each of the plurality of voxels based on the features extracted from the sampling patches oriented to each of the plurality of discrete orientations using a trained vessel orientation tensor classifier. A vessel orientation tensor is calculated at each of the plurality of voxels in the medical image based on the classification scores of the plurality of discrete orientations at that voxel.

These and other advantages of the invention will be apparent to those of ordinary skill in the art by reference to the following detailed description and the accompanying drawings.

DETAILED DESCRIPTION

Figure 1:
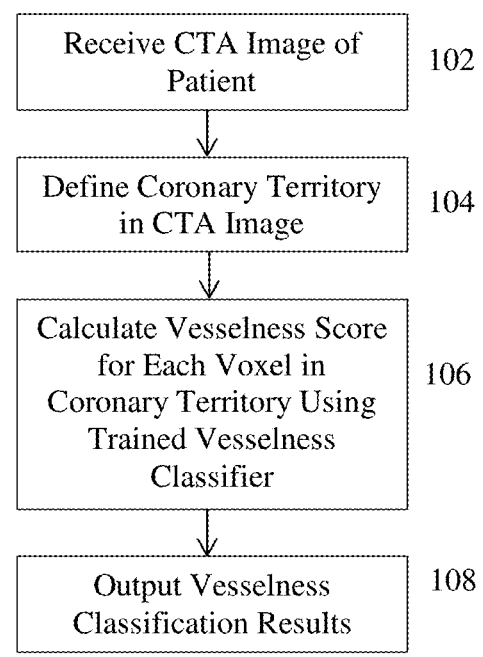
FIG. 1 illustrates a method for machine learning based coronary vesselness detection in a computed tomography angiography (CTA) image according to an embodiment of the present invention.

The present invention relates to methods and systems for machine learning based detection of vessels in medical images and machine learning based estimation of anisotropic vessel orientation tensors from medical images. Embodiments of the present invention are described herein to give a visual understanding of the machine learning based vessel detection and machine learning based anisotropic vessel orientation tensor estimation methods. A digital image is often composed of digital representations of one or more objects (or shapes). The digital representation of an object is often described herein in terms of identifying and manipulating the objects. Such manipulations are virtual manipulations accomplished in the memory or other circuitry/ hardware of a computer system. Accordingly, is to be understood that embodiments of the present invention may be performed within a computer system using data stored within the computer system.

Machine Learning Based Vesselness Detection

One embodiment of the present invention relates to machine learning based vesselness detection. This embodiment is described herein using the application of detecting coronary arteries in a computed tomography angiography (CTA) image. However, it is to be understood that the methods described herein can be similarly applied to detect other types of vessels (e.g., liver arteries, cerebral arteries, renal arteries, etc.) in CTA or other types of medical images. In this embodiment, a binary classifier is trained to assign a high probability to voxels inside coronary arteries and a low probability to voxels outside. This probability can be incorporated as a vesselness measurement into higher level segmentation algorithms such as region growing or advanced centerline and lumen extraction techniques. In an advantageous implementation, the complete coronary tree can be detected in a CTA image, including the main coronary branches and side downstream branches. In order to account for the large variation in coronary artery size, two separate classifiers for small and large coronary arteries can be trained and the final probability is computed based on the maximum of two. Both geometric and image based features can be used to train the classifiers. However, some of the image based features are computationally very expensive and it is not practical to extract them for every voxel. Therefore, in an advantageous embodiment, a two stage cascade classifier can be trained where the first stage efficiently eliminates a majority of the non-coronary voxels using cheap features and the second stage focuses on harder training examples using more expensive features. In an advantageous embodiment, a third stage classifier, which is trained on features extracted from both original image and the probability output of the second stage classifier, can also be used. This third stage classifier improves the detection quality by removing speckle noise and also closing gaps introduced by misclassified voxels. In an exemplary implementation, in order to speed up the detection time and reduce false positives, the detection can be run only for voxels inside a coronary territory defined by automatically detected chambers, pericardium, and aortic root structures of the heart.

FIG. 1 illustrates a method for machine learning based coronary vesselness detection in a computed tomography angiography (CTA) image according to an embodiment of the present invention. The method of FIG. 1 generates a vesselness map from CTA image that provides predicted locations of the coronary arteries in the CTA image. It is to be understood that the method of FIG. 1 can be similarly applied to detect another type of vessel of interest (e.g., liver artery, renal artery, cerebral artery, etc.) from a CTA image or other type of medical image.

At step 102, a CTA image of a patient is received. The CTA image can be a 3D coronary CTA image that includes at least all of a portion of the coronary arteries of the patient. The CTA image can be received directly from a CT scanner or can be received by loading a previously stored CTA image or receiving an electronic transmission of a CTA image from a remote computer device.

At step 104, a coronary territory is defined in the CTA image. Coronary arteries lie roughly on the surface of the heart between the heart chambers and the pericardium. In an advantageous embodiment, the four heart chambers, the pericardium, and the aortic root are detected in the CTA image and used to define a coronary territory, and the training and detection are constrained to only voxels inside the coronary territory defined by the automatically detected heart chambers, pericardium, and aortic root structures. The use of the coronary territory to constrain the detection is advantageous in that it both improves runtime and achieves a reduced false positive rate by excluding non-coronary voxels outside the territory.

Figure 2:
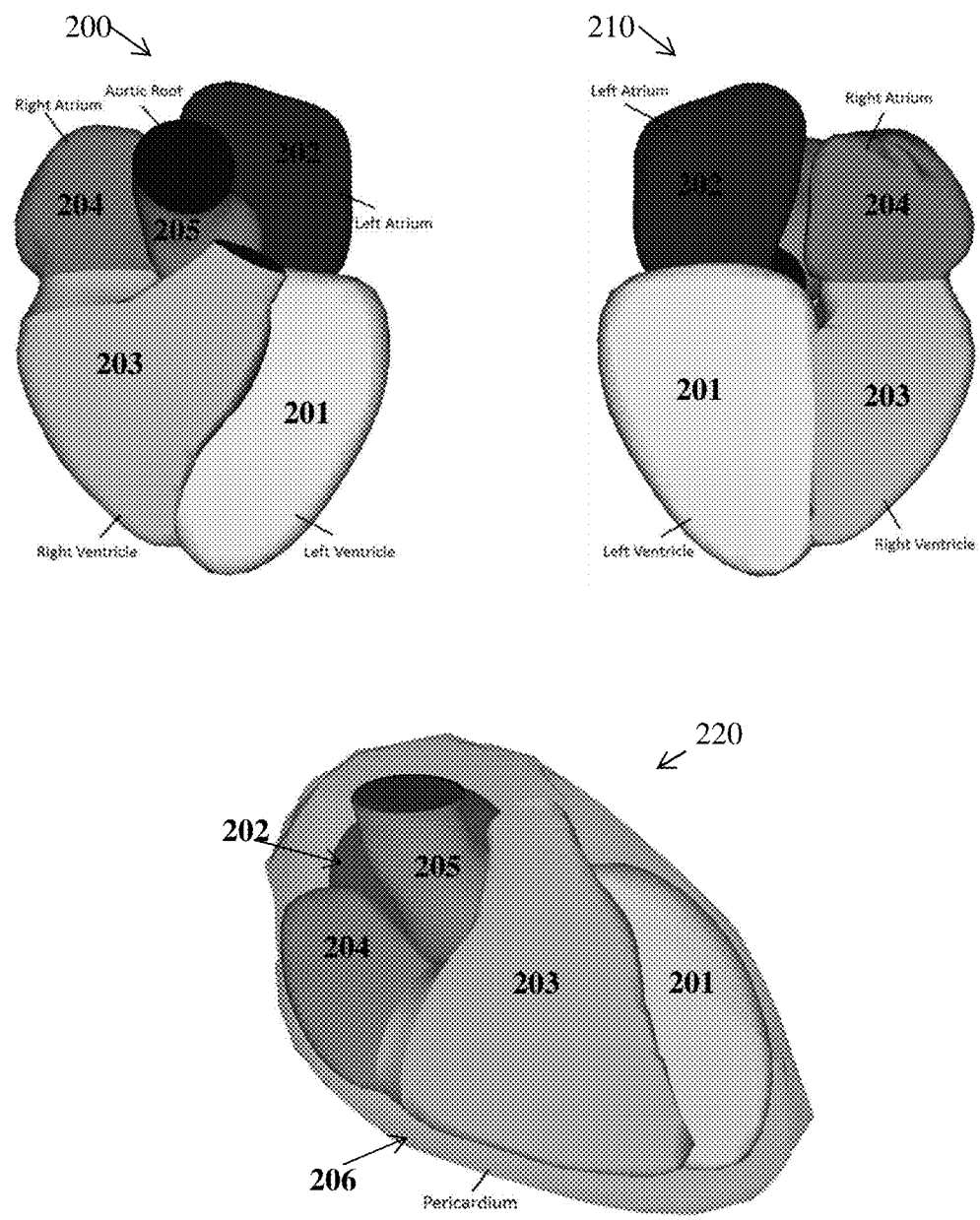
FIG. 2 illustrates an exemplary patient-specific heart model detected in a CTA image.
Figure 3:
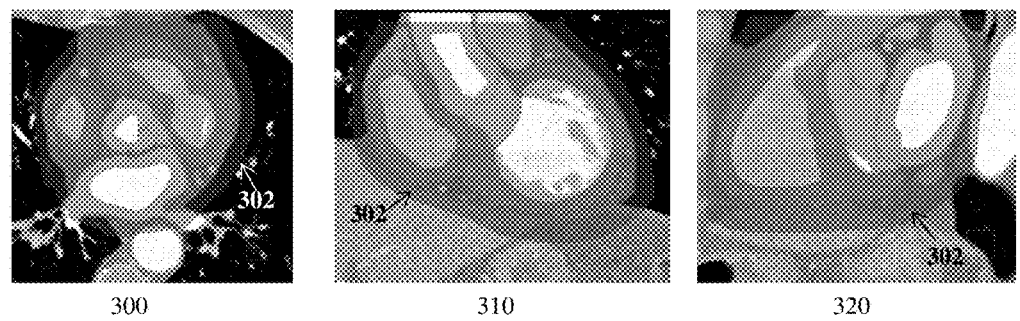
FIG. 3 illustrates an example of coronary territory defined in a CTA image.

A patient-specific heart model including four cardiac chambers, pericardium, and aortic root meshes can be automatically detected in CTA image using the methods described in U.S. Pat. No. 7,916,919, entitled "System and Method for Segmenting Chambers of a Heart in a Three Dimensional Image", U.S. Pat. No. 8,675,943, entitled "Method and System for Heart Isolation in Cardiac Computed Tomography Volumes for Patients with Coronary Artery Bypasses", and United States Patent Publication No. 2010/0239148, entitled "Method and System for Automatic Aorta Segmentation", the disclosures of which are incorporated herein by reference in their entirety. This detection can be performed as a preprocessing step and is very fast, i.e., taking about 3-4 seconds. FIG. 2 illustrates an exemplary patient-specific heart model detected in a CTA image. As shown in FIG. 2, images 200 and 210 show anterior and posterior views, respectively, of the patient-specific heart model including the detected left ventricle (LV) 201, left atrium (LA) 202, right ventricle (RV) 203, right atrium (RA) 204, and aortic root 205 meshes. Image 220 shows the detected pericardium mesh 206. A pericardium mask is defined by the detected pericardium mesh and a four chambers+aortic root mask is defined by the LV, LA, RV, RA, and aortic root meshes. The coronary territory can be defined inside the region between pericardium and four chambers+aortic root masks. However, in order to make the coronary territory more robust to errors in heart model detection, the four chambers+aortic root mask can be shrunk by a predetermined amount (e.g., 10 mm), the pericardium mask can be expanded by a predetermined amount (e.g., 10 mm), and the coronary territory can be defined inside the region between the expanded pericardium mask and the shrunk four chambers+aortic root mesh. FIG. 3 illustrates an example of coronary territory defined in a CTA image. As shown in FIG. 3 images 300, 310, and 320 show a coronary territory mask 302 overlaid on an axial multiplanar reconstruction (MPR) view, a coronal MPR view, and a sagittal MPR view, respectively, of a CTA volume. The predetermined size (e.g., 10-mm) band widths can be empirically tuned based on training datasets to make sure all coronaries in the training data are inside the coronary territory mask.

Although the use of the coronary territory improves runtime and reduces false positives, in other possible implementations, coronary vesselness detection can be performed without first defining the coronary territory by scanning all voxels in the input CTA image with the trained classifier. In the case in which no coronary territory is defined, the classifier is also trained with negative training samples selected from outside of the coronary territory in training CTA images. It is to be understood, that for other types of vessels (e.g., liver arteries, renal arteries, cerebral arteries, etc.), a territory corresponding to the organ of interest can be defined or the vesselness detection may be performed without being constrained to a particular territory in the medical image.

Returning to FIG. 1, at step 106, a vesselness score is calculated for each voxel of the CTA in the defined coronary territory by a trained machine learning based vesselness classifier. According to an advantageous embodiment, the trained vesselness classifier is a sequence of trained classifiers that calculate probability scores for the voxels based on image or geometric features extracted for each voxel. The vesselness classifier is trained based on annotated training data in an offline training phase, and then the trained vesselness classifier is applied to calculate vesselness scores for the voxels of the received CTA image.

Figure 4:
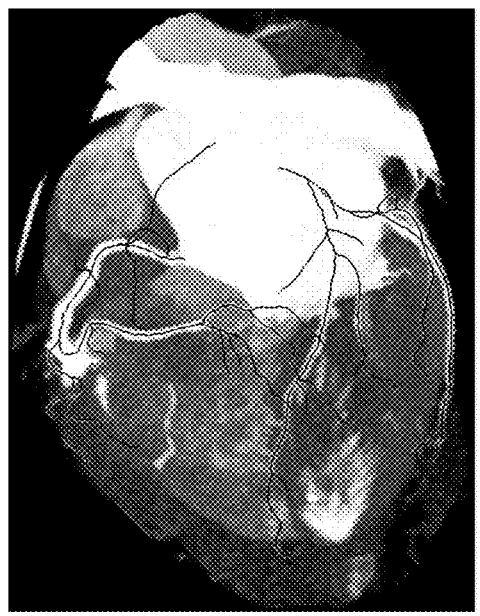
FIG. 4 illustrates examples of expert annotations of coronary arteries.
Figure 4:
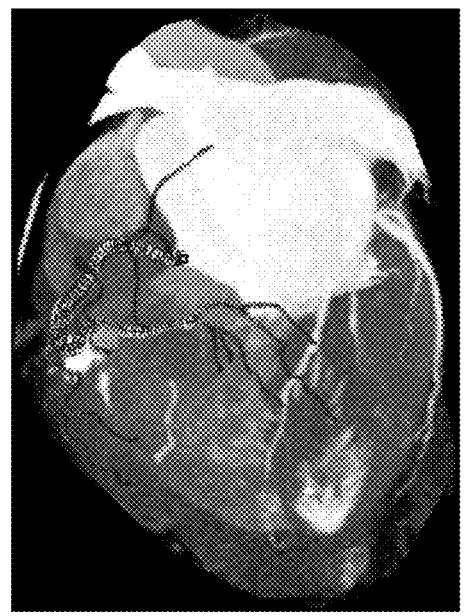
Figure 5:
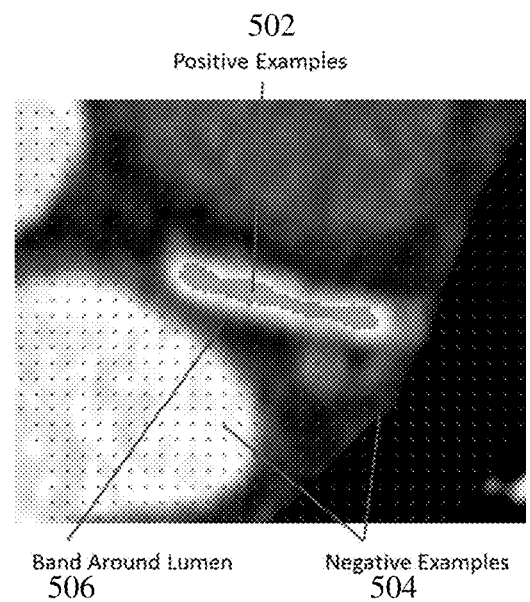
FIG. 5 illustrates an example of sampling positive and negative training samples from a CTA image.

The training of the vesselness classifier is performed as follows. The focus of the training is to train a classifier that assigns high probabilities to coronary voxels and low probabilities to voxels not within the coronary arteries. Therefore, positive and negative training examples are sampled inside and outside the coronary arteries, respectively, in training CTA images. In an exemplary implementation, expert annotated CTA datasets with whole left coronary artery (LCA) and right coronary artery (RCA) centerline trees can be used. Each centerline tree includes densely sampled centerline points with a rough estimate of a corresponding cross-sectional vessel radius. FIG. 4 illustrates examples of expert annotations of coronary arteries. As shown in FIG. 4, image 400 shows expert annotations of LCA and RCA centerlines overlaid on a maximum intensity projection (MIP) rendering of an exemplary CTA dataset. Image 410 shows cross-sectional radii of RCA centerline points depicted with circular contours overlaid on a MIP rendering of an exemplary CTA dataset. In an advantageous implementation, due to the large number of voxels in a typical CTA dataset with 512×512×200 voxels, training examples can be sampled only inside of a defined coronary territory mask in each training image. In addition, to avoid confusing the classifier and to make training robust to centerline and scale errors in annotation, voxels within a certain size band around the lumen boundary are excluded from training examples. In particular, positive training examples are sampled for every voxel in a specified proximity of annotated coronary centerlines, i.e., all voxels within a half radius range of the annotated coronary centerlines are sampled as positive training examples. Negative training examples are sparsely sampled outside a banded coronary lumen mask which can be obtained by dilating the lumen mask with a distance equivalent to the corresponding cross-sectional radius at each point along the coronary artery. For example, negative training examples can be sampled at every fourth voxel outside of the banded coronary lumen mask. Note that the negative training examples may include voxels in veins or other vessels inside the coronary territory. These voxels are very hard and confusing negative examples, especially, those inside the veins with similar contrast and scale as the coronary arteries. FIG. 5 illustrates an example of sampling positive and negative training samples from a CTA image. As shown in FIG. 5, positive training examples 502 are sampled by sampling all voxels within a half radius range of an annotated coronary artery centerline, and negative training examples 504 are sparsely sampled outside of a band 506 around the lumen of the coronary artery. Voxels inside the band 506 around the lumen are excluded (i.e., not sampled as positive or negative training examples) to avoid confusing the classifier.

Figure 6:
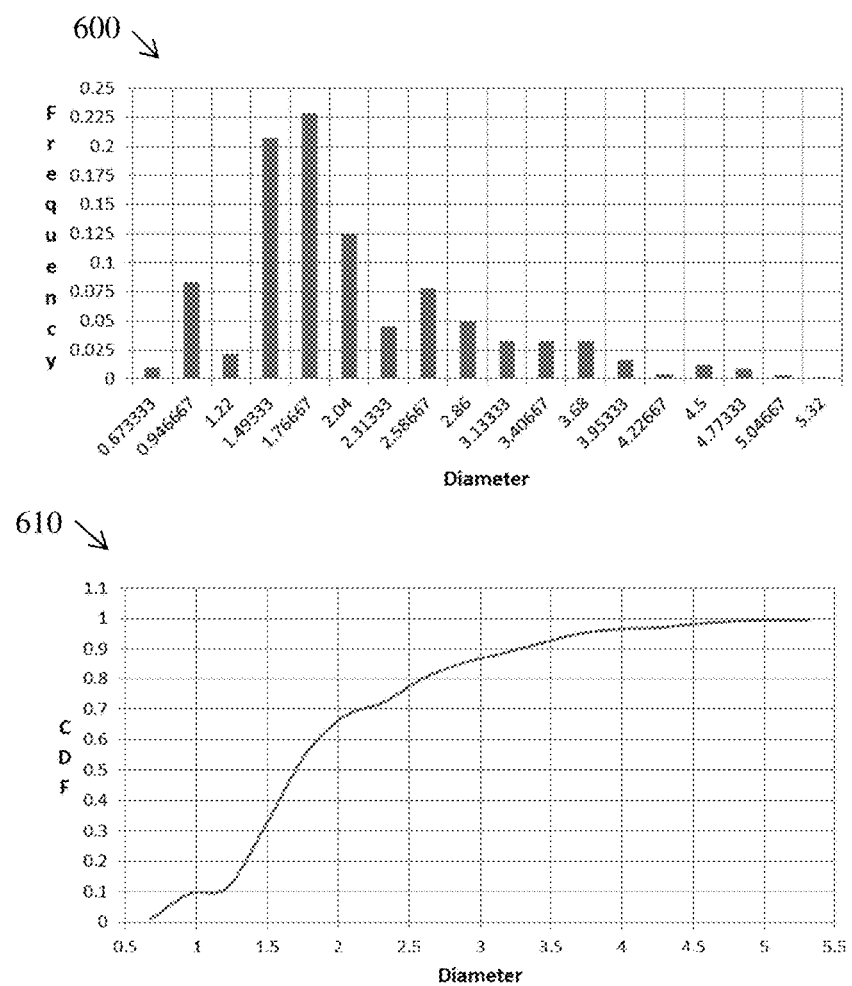
FIG. 6 illustrates a distribution of coronary artery diameters sampled along centerline points in an exemplary set of training data.

It is desirable to achieved high detection accuracy for both main coronary branched and side downstream branches. FIG. 6 illustrates a distribution of coronary artery diameters sampled along centerline points in an exemplary set of training data. As shown in FIG. 6, image 600 shows a normalized histogram showing the frequency of coronary artery diameters sampled along centerline points in an exemplary training dataset of 90 CTA images. Image 610 shows a cumulative density function of the annotated coronary artery diameters sampled along the centerline points in the exemplary training dataset of 90 CTA images. In an advantageous embodiment, in order to better tune feature parameters for different vessel scales, two separate vesselness classifiers are trained: one for small scale coronary arteries, and one for large scale coronary arteries. In an exemplary implementation, positive training examples sampled from coronary arteries with diameters within the range 0.5-2.0 mm are used to train the small scale vesselness classifier and positive training examples sampled from coronary arteries with diameters within the range 2-6 mm are used to train the large scale vesselness classifier. The same negative training examples are used to train both scale classifiers.

For classification purposes, a set of geometric and image features can be extracted for the positive and negative training examples in training, as well as for voxels of the received CTA image in prediction/detection. As described in greater detail below, the specific features extracted for each training example or voxel can vary based the classification results within a cascade of trained machine learning based classifiers. The geometric and image features can include all or some combination of an anatomy context based geometric feature and image features including steerable features, intensity Hessian based vesselness, local intensity statistics, and gradient covariance based features. Each of these features is described in greater detail below.

Figure 7:
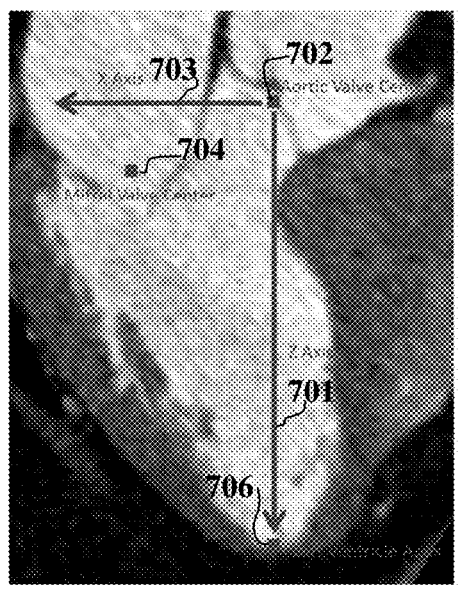
FIG. 7 illustrates the heart coordinate system defined by the aortic valve center, the mitral valve center, and the left ventricle apex.

The anatomy context based geometric feature uses the sample (voxel) position as a geometric feature. There is a strong geometric correlation between the coronary arteries and the heart. However, due to variation in shape, size and pose of heart through patients, the sample position is considered relative to a heart coordinate system defined by three landmarks, namely, the aortic valve center, the mitral valve center and the left ventricle endocardium apex. These landmarks are automatically detected as a by-product of heart model detection performed using the method described in U.S. Pat. No. 7,916,919, entitled "System and Method for Segmenting Chambers of a Heart in a Three Dimensional Image", the disclosure of which is incorporated herein by reference in its entirety. FIG. 7 illustrates the heart coordinate system defined by the aortic valve center 702, the mitral valve center 704, and the left ventricle apex 706. As shown in FIG. 7, the z axis 701 is defined as the direction pointing from the aortic valve center 702 to the left ventricle apex 706. The y axis is the vector perpendicular to the plane formed by three landmarks 702, 704, and 706. The x axis 703 is the cross product of the y and the z axes. In order to account for the variation of the heart size, this coordinate system is normalized by a rough estimate of the pericardium structure size. In particular, the average of distances from pericardium mesh points to their mean point can be considered to be the pericardium size and can be used to normalize the coordinate system. The three-dimensional position of the sample (voxel) in this heart coordinate system is then determined and used as anatomy context based geometric feature.

It is possible that the image contrast may have variations through patient CTA datasets due to different scanners and image acquisition settings used. Therefore, intensity volumes can be normalized relative to the image contrast in the aorta prior to extracting image features. For example, the intensities of a CTA volume can be normalized by dividing the voxel intensities by the $60^{th}$ percentile of intensity values in the detected aorta root mask and then multiplying those values with a fixed scale (e.g., 2500). Image features, including steerable features, intensity Hessian based vesselness, local intensity statistics, and/or gradient covariance based features, can then be extracted from the normalized intensity volume.

Steerable features are an efficient framework, which is capable of capturing complicated image patterns. Steerable features include local image gradient and intensity features extracted at grid points sampled around given position. Additional details regarding steerable features are described in U.S. Pat. No. 7,916,919, entitled "System and Method for Segmenting Chambers of a Heart in a Three Dimensional Image", the disclosure of which is incorporated herein by reference in its entirety. In an exemplary implementation, around a given position, 11×11×11 grid points are sampled with 0.5 and 1 mm resolution to train the small and large scale classifiers, respectively. This grid pattern has a fixed orientation and aligned with z axis of the volume. Local features that are transformations of intensity and gradients are extracted, where three axes of the volume coordinate system are used for gradient projection and angle computation. For example, the following 24 local features can be extracted for each sampling point: $I$, $\sqrt{I}$, $\sqrt[3]{I}$, $I^2$, $I^3$, $\log I$, $\|g\|$, $\sqrt{\|g\|}$, $\sqrt[3]{\|g\|}$, $\|g\|^2$, $\|g\|^3$, $\log \|g\|$, $\alpha$, $\sqrt{\alpha}$, $\sqrt[3]{\alpha}$, $\alpha^2$, $\alpha^3$, $\log \alpha$, $g_x$, $g_y$, $g_z$, $n_x \cdot g$, $n_y \cdot g$, and $n_z \cdot g$. In this case I is the image intensity and $g=(g_x, g_y, g_z)$ is the gradient at the sampling point (x,y,z), $n_x$, $n_y$, $n_z$ are the three axes of an object oriented local coordinate system, and $\alpha = \arccos(n_z \cdot g)$ is the angle between the gradient g and the z axis, where $n_z \cdot g$ is the inner product between two vectors $n_z$ and g. The first six of these features are based on intensity, and the remaining 18 are transformations of gradients. Additionally, 14 gradient projection and angle features can be computed based on the vector from the sample position to grid point. 3 local image Hessian features can be computed including the Laplacian of Hessian, directional curvature along the z axis, and the vector from the sample position to grid point. The image gradient and Hessian matrix can be computed based on central finite difference approximation using different step sizes, e.g., from 0.25 to 1.5 mm with 0.25 mm increments for the small scale classifier and from 0.5 to 2.5 mm with 0.5 mm increments for the large scale classifier, where for each step size, a new set of features is created.

Intensity Hessian based vesselness is a widely used measure for tubularity. It is based on the eigenvalues of Hessian matrix computed at a voxel position. The Hessian matrix is normally calculated at multiple scales in order to capture the true vessel scale. Similar to steerable feature extraction, the Hessian matrix based local features are extracted at grid points sampled around a given position. In an exemplary implementation, 7×7×7 grid points are sampled around a given location with 0.5 and 0.75 mm resolution to train the small and large scale classifiers, respectively. This grid pattern has a fixed orientation and aligned with z axis of the volume. For each grid point, Hessian matrix based features are computed. In addition, the normalized eigenvalues based on the spectral norm of the Hessian matrix, the directional curvature along the z axis, and the vector from sample position to grid point are also used as features. The Hessian matrix is computed based on central finite difference approximation using different step sizes, e.g., from 0.25 to 1 mm with 0.25 mm increments for the small scale classifier, and from 1 to 3 mm with 0.5 mm increments for the large scale classifier, where for each step size, a new set of features is created.

Features are also extracted based on local intensity statistics (e.g., minimum, maximum, mean, standard deviation, normalized standard deviation, median, and/or midrange) for voxels inside a small block around each sample position. In addition, a normalized intensity histogram is computed, e.g., with 10 bins, and each histogram bin is used as a feature. In an exemplary implementation, intensities are sampled inside a 7×7×7 block with 2 voxel step size.

Hessian based vesselness measure has drawbacks when the background intensities are inhomogeneous due to touching nearby structures which adversely affect the second derivative calculation, especially, for thick vessels. According to an advantageous embodiment of the present invention, a new set of features based on the covariance matrix of gradient vectors around sample position is used. This measure relies on the fact that gradient vectors along the lumen boundary have strong correlation, i.e., they roughly point towards the vessel centerline. If gradient vectors are locally sampled along the lumen boundary around a sample position and the gradient vectors are represented as three-dimensional points, then these gradient points should be ideally symmetric around the origin and lie on a plane in 3D space. Features are extracted based on the eigenvalues of the covariance matrix of these gradient points. Suppose that $\lambda_1$, $\lambda_2$ and $\lambda_3$ are the eigenvalues of the covariance matrix of gradient points and $|\lambda_1| \leq |\lambda_2| \leq |\lambda_3|$. Let $G_{mean}$ be the mean of gradient points.

$$R_A = |\lambda_2|/|\lambda_3|, R_B = |\lambda_1|/\sqrt{\lambda_2^2 + \lambda_3^2}, R_C = \sqrt{\lambda_1^2 + \lambda_2^2 + \lambda_3^2}, S = \|G_{mean}\|_2 / \sqrt{|\lambda_3|}$$

where $\lambda_1$, $\lambda_2$, $\lambda_3$, $R_A$, $R_B$, $R_C$, and S are used as features. Intuitively, $R_A$ and $R_B$ measure the goodness of plane fit, and $R_A$ approaches to 1 and $R_B$ approaches to 0 for a tubular structure. $R_C$ is included as a measure of the strength of gradients in order to make the classification robust to noise. The measure S is expected to be low when the gradient points are symmetric around origin. In an advantageous implementation, gradient vectors are computed for points sampled in a 5×5×5 grid aligned with the z axis around the sample position. In order to capture different vessel scales, we use multiple grid resolutions, e.g., from 0.5 to 1.5 mm with 0.25 mm increments for the small scale classifier and from 1 to 3 mm with 0.5 mm increments for the large scale classifier, where for each resolution, a new set of features is created.

According to an advantageous embodiment, probabilistic boosting trees (PBT) are used to train the vesselness classifiers. The PBT method is a general framework to learn a posterior distribution. It uses a divide-and-conquer strategy to recursively learn a tree with strong AdaBoost classifier nodes. Different than a cascade approach, PBT naturally divides both positive and negative examples towards deeper levels of the tree for improved classification accuracy and speed. The level of the tree and the number of weak classifiers used at each node determine the accuracy and speed of the classifier. Increasing either can improve the training accuracy but increases classification runtime and may over fit to training data. Speed can be improved by eliminating a large number of negative examples in a cascade fashion at the root node of the tree with as few features as possible and then by using more features to make stronger predictions for harder examples in deeper levels of the tree.

The feature set described herein includes both computationally inexpensive features (geometric and steerable features) and computationally expensive features (Hessian based vesselness, local intensity statistics, gradient covariance based features). However, it is not practical to compute the expensive features for every voxel, even if only a few of the expensive features are calculated at the root node of the PBT tree. Therefore, in an advantageous embodiment of the present invention, a two-stage cascade approach is used, with each stage being a separate PBT classifier. The first stage is trained on all examples using cheap features in order to reject a significant number of negatives with very high sensitivity, e.g., 99.4%. The second stage is trained on only negative examples that pass the first stage. The number of positive examples is much smaller than negatives in our training data. Therefore, we use all positive examples to train the second stage PBT for better generalization.

Figure 8:
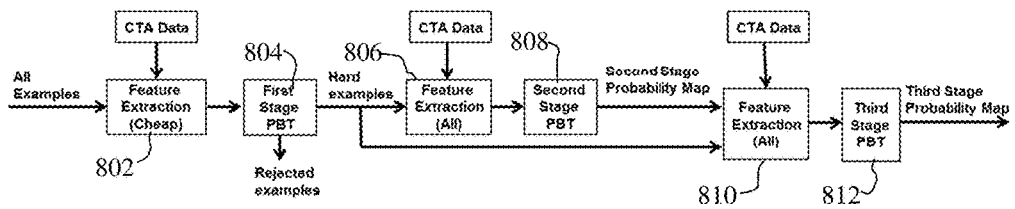
FIG. 8 illustrates training a cascaded Probabilistic Boosting Tree (PBT) vesselness classifier according to an embodiment of the present invention.

FIG. 8 illustrates training a cascaded PBT vesselness classifier according to an embodiment of the present invention. The small scale vesselness classifier and the large scale vesselness classifier can each be trained using a cascaded PBT structure, such as the cascaded PBT structure shown in FIG. 8. As shown in FIG. 8, feature extraction 802 is performed on all training examples to extract only the inexpensive/efficient ("cheap") features from CTA volumes for each of the training examples. In an exemplary implementation, the cheap features extracted from the CTA data are the anatomy context based geometric feature and the steerable features. The first stage PBT 804 is trained on all of the training examples using only the efficient ("cheap") features extracted from CTA volumes. In an exemplary implementation, the first stage PBT 804 has four levels with 15, 20, 25, and 30 weak classifiers, respectively, and its root node is set to achieve a cascade criteria with a detection rate no less than 99.8% and a false positive rate of no more than 50%. In an exemplary implementation, a first stage probability threshold that rejects 89% of the negative training examples with a 99.6% sensitivity is set for the small scale first stage classifier, and a first stage probability threshold that rejects 88% of the negative training examples with a 99.5% sensitivity is set for the large scale first stage classifier. Training examples rejected (i.e., classified as negative) by the first stage PBT 804 are discarded and negative training examples that are rejected by the first stage PBT 804 are not further used in training the vesselness classifier. Training examples that are classified as positive by the first stage PBT 804 are considered to be "hard" examples, and are used to train the second stage PBT 808. Feature extraction 806 is performed on all of the hard examples that are not rejected by the first stage classifier 804 to extract all of the features including the expensive features (e.g., Hessian based vesselness, local intensity statistics, and gradient covariance based features) and the inexpensive features (e.g., context based geometric feature and steerable features) from the CTA volumes for each of the hard examples. The second stage PBT 808 is trained on the hard examples that are not rejected by the first stage classifier 804 using all of the features, including the expensive features, for better classification accuracy. In an exemplary implementation, the second stage PBT 808 has four levels with 25, 30, 35, and 40 weak classifiers, respectively, where the cascade criteria for its root node is 99.7% detection rate and 50% false positive rate. The second stage PBT 808 classifies each of the hard examples and outputs a second stage probability map.

In a possible embodiment, vesselness classifier can include the first stage PBT 802 and the second stage PBT 804, and the second stage probability map output by the second stage PBT 808 can be the final output of the vesselness classifier. However, in the embodiment of FIG. 3, a third stage PBT 812 is also added to improve the detection quality by removing noise and closing some voxel wide gaps. Feature extraction 810 for the hard examples used to train the second stage PBT 808. Feature extraction 810 extracts all of the features (expensive and inexpensive) from both the CTA volume and the second stage probability map output by the second stage PBT 808 for each of the hard examples. The third stage PBT 812 is trained on the same examples used for the second stage, but with features extracted from both the intensity volume and the second stage probability output. In an advantageous implementation, the third stage PBT 812 tree parameters are similar to the second stage PBT 808 and uses the same set of features.

The small scale vesselness classifier and the large scale vesselness classifier are each trained using the cascaded PBT structure (e.g., two stage or three stage) described above. In step 106 of FIG. 1, in order to predict vesselness scores for voxels in a newly received CTA image, detection/classification is run for each voxel inside the defined coronary territory mask using both the trained small scale vesselness classifier and the trained large scale vesselness classifier, and the maximum of the small scale classifier probability score and the large scale classifier probability score for each voxel is used as the final vesselness score for that voxel. In each of the trained small and large scale classifiers, voxels are classified using the trained cascaded PBTs. That is, the inexpensive features (e.g., anatomy context based geometric feature and steerable features) are extracted from the CTA image for each voxel and each voxel is classified by the trained first stage PBT using the inexpensive features. Voxels that are rejected (classified as negative) by the trained first stage PBT (i.e., having a first stage probability score less than the first stage probability threshold) are not further processed and are assigned a vesselness score of zero. Expensive features (e.g., Hessian based vesselness, local intensity statistics, and gradient covariance based features) are extracted from the CTA image for voxels classified as positive by the trained first stage PBT (i.e., having a first stage probability score greater than the first stage probability threshold), and the voxels classified as positive by the trained first stage PBT are then classified by the trained second stage PBT using the inexpensive and the expensive features. In one embodiment, the second stage probability score calculated by the trained second stage PBT can be the final probability score for the voxels classified by the trained second stage PBT. In an alternative embodiment, the voxels classified by the trained second stage PBT can be further classified by a trained third stage PBT cased on the entire set of features (inexpensive and expensive) extracted from both the CTA image and the second stage probability map for each of those voxels.

Figure 9:
FIG. 9 illustrates exemplary coronary vesselness detection results.
Figure 9:
Figure 9:
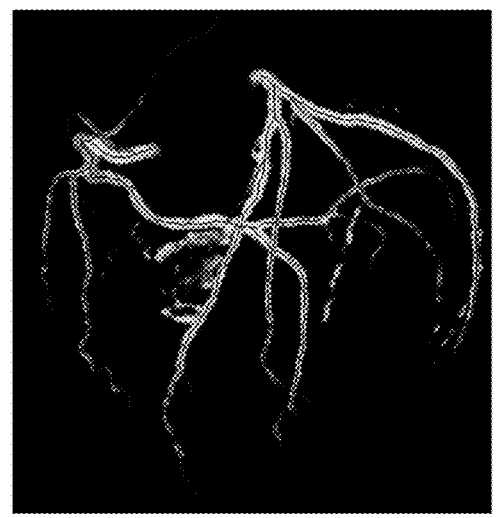

Returning to FIG. 1, at step 108, the vesselness classification results for the CTA image are output. The vesselness classification results can be output by displaying the vesselness classification results, for example on a display device of a computer screen. The vesselness classification results can be displayed as a vesselness map (probability map), in which the intensity of each voxel represents the vesselness score calculated for that voxel. For example, the vesselness scores for the voxels of the CTA image can be re-scaled to have values between 0-4095 for visualization purposes. VRT rendering of the re-scaled vesselness scores can be used to display a rendered 3D view of the vesselness map on a 2D display. It is also possible that 2D vesselness maps corresponding to various 2D slices of views of the 3D CTA image can be displayed. The vesselness classification results can also be displayed as a binary vesselness map. In this case voxels with vesselness scores above a certain threshold are displayed with a predetermined intensity value and voxels with probability scores below the threshold are assigned an intensity value of 0. In a possible implementation, a vesselness mask may be generated by applying various thresholds to the detected vesselness scores and computing connected components starting from voxels around a local neighborhood (e.g., 5 mm) of coronary ostia points. In this case, the vesselness mask may only show voxels inside the connected component mask as positive detections. FIG. 9 illustrates exemplary vesselness detection results. As shown in FIG. 9, image 900 shows a VRT visualization of vesselness scores detected without a third stage classifier image for an exemplary CTA image, with ground truth centerlines overlaid. Image 910 shows a VRT visualization of vesselness scores detected with a third stage classifier for the exemplary CTA image, with ground truth centerlines overlaid.

The vesselness classification results may also be used in a vesselness based region growing algorithm to perform segmentation of the coronary arteries. In an exemplary embodiment, coronary artery ostia points can be detected as a byproduct of the aortic root detection described in United States Patent Publication No. 2010/0239148, entitled "Method and System for Automatic Aorta Segmentation", the disclosure of which is incorporated herein by reference in its entirety. Region growing can be performed starting from the voxels within a local neighborhood (e.g., 5 mm) of the coronary ostia points. In an exemplary implementation, the region growing uses 26 neighbor voxel connectivity and visits voxels with vesselness scores above a specified threshold. In order to prevent leakage to other structures, such as bones, the region growing can be constrained to only voxels within the defined coronary territory mask. In a possible implementation, the vesselness scores can be computed by the trained vesselness classifiers on a voxel-by-voxel basis during the region growing propagation. In this case, the third stage classifier is not used in the region growing due to missing the second stage probability map output. Referring again to FIG. 9, image 920 shows a VRT visualization of a region growing detection result with a 0.5 vesselness score threshold.

Figure 10:
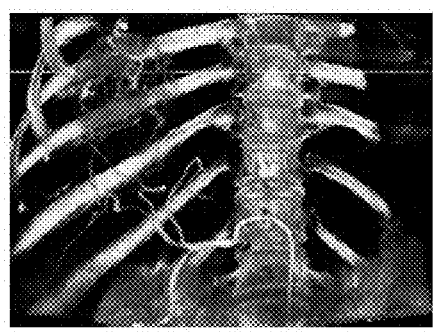
FIG. 10 illustrates exemplary vesselness detection results for liver arteries in a cone beam CT image.
Figure 10:
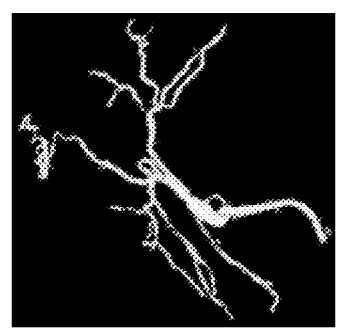

Although the method of FIG. 1 is described as detecting coronary vesselness in a CTA image, the method can be similarly applied for detecting vesselness of other target vessels (e.g., liver arteries, renal arteries, cerebral arteries, etc.) in medical image data. FIG. 10 illustrates exemplary vesselness detection results for liver arteries in a cone beam CT image. As shown in FIG. 10, image 1000 shows a cone beam CT image of the liver and image 1010 shows VRT rendering of threshold vesselness detection results for the liver arteries in the cone beam CT image 1000.

Machine Learning Based Estimation of Anisotropic Vessel Orientation Tensor

Another embodiment of the present invention relates to machine learning based estimation of anisotropic vessel orientation tensors in medical images. This embodiment is described herein using the application of estimating coronary orientation tensors in a CTA image. However, it is to be understood that the methods described herein can be similarly applied to detect other types of vessels (e.g., liver arteries, cerebral arteries, renal arteries, etc.) in CTA or other types of medical images. Vesselness measurements typically only generate a scalar value for each pixel in an image (or voxel in a 3D volume), representing the probability for this pixel/voxel to be inside a vessel. However, no estimate of the vessel orientation is provided even though such orientation information is very useful to guide the centerline tracing. In this embodiment of the present invention, a classification based approach is used for predicting an anisotropic orientation tensor of a coronary artery at an image voxel that can be used to compute a likelihood of a particular direction being aligned with the true vessel orientation. Predicted orientation tensors obtained in this embodiment can be utilized in several ways. For example, the predicted orientation tensors can be utilized to guide centerline tracing methods to prevent shortcuts by penalizing tracing towards lumen wall. The predicted orientations can also be utilized to learn more reliable vesselness or medialness models that can deal with vessels of different orientations by aligning underlying models with tensor's major principal components. The predicted orientation tensors can also be utilized to highlight the coronaries and suppress their background by computing a vesselness score based on the tensor's magnitude, i.e., its first principal component or norm.

According to an embodiment of the present invention, a machine learning based classifier is trained that can calculate probabilistic orientation scores that can be used to form vessel orientation tensors. The principal directions of the tensor and it eigenvalues relate the coronary flow along each direction at a particular voxel, giving a local anisotropic structure. Accordingly, the orientation tensors can provide robust orientation information, especially, at bifurcations regions where vessels have more than one true orientation.

In an advantageous embodiment, a set of discrete orientations are constructed at each voxel based on the position of that voxel along with those of a subset of its neighboring voxels. In an exemplary implementation, all of the immediate neighbors of the voxel are used to define respective discrete orientations, resulting in a total of 26 voxels being used to construct the discrete orientations. In particular, each discrete orientation is defined as a direction from the voxel to a respective one of its neighboring voxels. Since the orientation is a symmetric measure, the vessel orientation tensor estimation method can consider only 13 non-symmetric discrete orientations from the set of 26 discrete orientations. Note that it is also possible to use a broader template of neighbors to construct denser discrete orientations. According to an advantageous embodiment, at a given image voxel, a trained vessel orientation tensor classifier predicts classification scores for each of the discrete orientations (e.g., the set of 13 non-symmetric discrete orientations) and the predicted classification scores of the discrete orientations are then used to construct an orientation tensor for that voxel.

In the machine learning based vesselness detection embodiment describes above, machine learning based classifier is used to predict vesselness scores at image voxel locations using features extracted from a sample patch with fixed orientation (aligned with image axis). In this embodiment, the vessel orientation tensor classifier can have the same or a similar structure as the vesselness classifier described above, but with sample patches oriented along discrete orientations. The training examples used to train the vessel orientation tensor classifier are sampled to learn both location and orientation instead of only location as in machine learning based vesselness detection embodiment described above. Similar to machine learning based vesselness detection embodiment, separate small and large scale vessel orientation tensor classifiers can be trained and classification scores can be predicted at each voxel for both small and large scales in order to account for variation in coronary size.

The machine learning based classifier is trained to assign high probabilities to samples oriented along vessel direction at coronary voxels, and low probabilities to samples that have either false orientation or fall outside coronary lumen. In an exemplary implementation, expert annotated CTA datasets with whole left coronary artery (LCA) and right coronary artery (RCA) centerline trees can be used as training datasets. Each centerline tree includes densely sampled centerline points with a rough estimate of corresponding cross-sectional vessel radius. For training the vessel orientation tensor classifier, positive training examples are sampled for every voxel in the proximity of annotated coronary centerlines, e.g., voxels within a half radius range of the annotated coronary centerlines, where each positive example is assigned a discrete orientation that makes smallest angle with the true continuous vessel orientation. For negative training examples, all voxels inside the coronary lumen and within a certain size band around the lumen boundary can be sampled, and assigned the following sample orientations: If the voxel is within the band around the lumen boundary, all discrete orientations are used as negative training examples; Otherwise (i.e., for voxels inside the coronary lumen), discrete orientations that make an angle more than a certain degree (e.g., 45) with the true vessel orientation are used as negative training examples, in order not to confuse the classifier. The vessel orientation tensor classifier can be trained based on all or a subset of the geometric and image the features described above in the machine learning based vesselness detection embodiment (i.e., anatomy context based geometric feature, steerable features, Hessian based vesselness, local intensity statistics, and gradient covariance based features) extracted from the training examples at their respective discrete orientations. The vessel orientation tensor classifier can be trained using one or more PBTs. In a possible embodiment, the vessel orientation tensor classifier (for each the small and large scales) can be trained using a cascaded PBT structure that uses only inexpensive features (e.g., anatomy context based geometric feature and steerable features) to train a first stage PBT and uses the inexpensive features and expensive features (e.g., Hessian based vesselness, local intensity statistics, and gradient covariance based features) to train a second stage PBT, as described above in the machine learning based vesselness detection embodiment. In a possible implementation, the vessel orientation tensor classifier may also include a third stage PBT trained using all of the features extracted from both the CTA image data and a probability map generated by the second stage PBT, as described above in the machine learning based vesselness detection embodiment and illustrated in FIG. 8.

Figure 11:
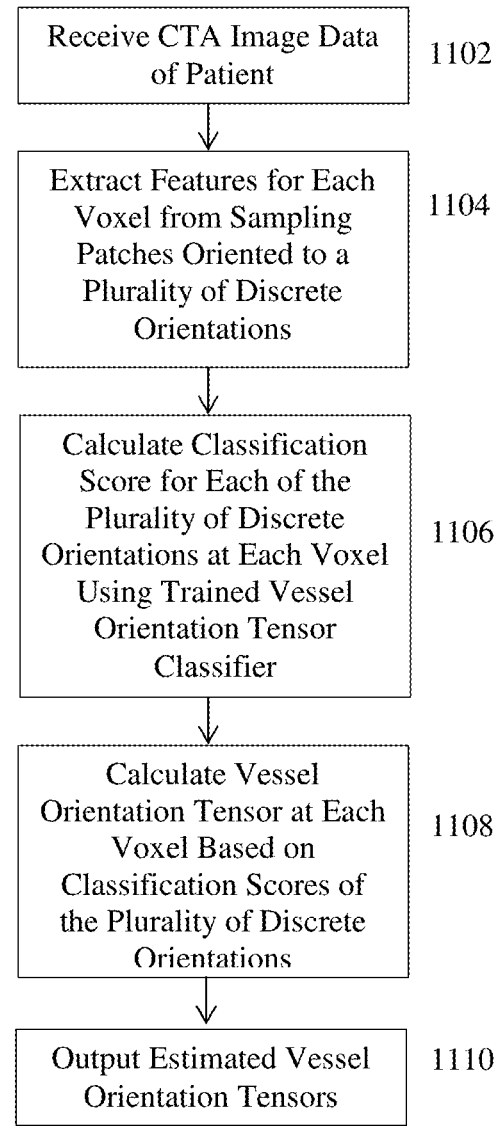
FIG. 11 illustrates a method for machine learning based vessel orientation tensor estimation according to an embodiment of the present invention.

FIG. 11 illustrates a method for machine learning based vessel orientation tensor estimation according to an embodiment of the present invention. In an exemplary embodiment described herein, the method of FIG. 11 can be used to estimate/detect vessel orientation tensors at coronary artery voxels in CTA image data. It is to be understood that the method of FIG. 1 can be similarly applied to estimate/detect vessel orientation tensors in other types of target vessels (e.g., liver artery, renal artery, cerebral artery, etc.) in CTA image data or other type of medical image data.

At step 1102, CTA image data of a patient is received. The CTA image data can be all or a portion of a 3D coronary CTA image that includes a target vessel, such as the coronary arteries. The CTA image data can be received directly from a CT scanner or can be received by loading a previously stored CTA image data or receiving an electronic transmission of the CTA image data from a remote computer device. In a possible implementation, the method of FIG. 11 may be applied to all voxels of a CTA image to detect both the location of the coronary voxels and the vessel orientation tensor at each of the coronary voxels. In another possible implementation, the method of FIG. 11 may be applied to voxels within a defined coronary territory of a CTA image to detect both the location of the coronary voxels within the constrained search space of the coronary territory and the vessel orientation tensor at each of the coronary voxels. In another possible implementation, the method of FIG. 11 may be applied to coronary voxels of a CTA image defined by a coronary vesselness map detected in the CTA image to estimate the vessel orientation tensor at each of the already detected coronary voxels. For example, coronary voxels in the CTA image can be detected by region growing using the above described machine-learning based vesselness classifier, and the method of FIG. 11 may be applied to the detected coronary voxels in the CTA image.

At step 1104, features are extracted from each voxel from sampling patches oriented to a plurality of discrete orientations. In an advantageous implementation, set of discrete orientations is the set of 13 non-symmetric discrete orientations defined for each voxel based on its neighboring voxels. For a given voxel, each of the plurality of discrete orientations is treated as an independent sample for which features are extracted and a classification score is calculated from those features. Accordingly, features for each of the discrete orientations at a voxel are extracted from respective image patches aligned with each of the discrete orientations that are sampled from the CTA image at the current voxel (i.e., image patches centered on the current voxel).

In an advantageous embodiment, all or a subset of the anatomy context based geometric feature, steerable features, Hessian based vesselness, local intensity statistics, and gradient covariance based features described above can be sampled at each of the plurality of discrete orientations for each voxel. In an exemplary implementation, for a given voxel, the steerable features can be extracted in a respective 11×11×11 image patch centered at the voxel aligned with each of the discrete orientations, the Hessian based vesselness and the local intensity statistics can be extracted in a 7×7×7 image patch centered at the voxel aligned with each of the discrete orientations, and the gradient covariance based features can be extracted in a 5×5×5 image patch centered at the voxel aligned with each of the discrete orientations.

At step 1106, a classification score is calculated for each of the plurality of discrete orientations at each voxel using a trained vessel orientation tensor classifier. The trained vessel orientation tensor classifier is trained, as described above, to assign high probabilities to samples oriented along vessel direction at coronary voxels, and low probabilities to samples that are not oriented along the vessel direction or fall outside coronary lumen. At a given voxel, each of the plurality of discrete orientations is treated as an independent sample that is classified by the trained vessel orientation tensor classifier based on the features extracted for that discrete orientation (i.e., from image patches aligned with that discrete orientation) at that voxel. Accordingly, the trained vessel orientation tensor classifier calculates a respective probabilistic classification score for each discrete orientation at each voxel.

In an advantageous embodiment, the trained vessel orientation tensor classifier can include a cascade of trained classifiers (e.g., cascaded PBTs) in which a trained first stage classifier classifies all samples (each discrete orientation at each voxel) based on inexpensive features (e.g., anatomy context based geometric feature and steerable features) and a trained second stage classifier calculates a classification score for each of the samples classified as positive by the trained first stage classifier using a full set of features including the inexpensive features and expensive features (e.g., Hessian based vesselness, local intensity statistics, and gradient covariance based features). In this case, the expensive features used by the trained second stage classifier are only extracted for samples classified as positive by the trained first stage classifier (i.e., samples with a first stage probability score greater than a probability threshold). Samples classified as negative by the trained first stage classifier are assigned a classification score of 0. In a possible implementation, the trained vessel orientation tensor classifier may also include a trained third stage classifier that calculates a probability score for the samples classified as positive by the trained first stage classifier based on the full set of features extracted from the CTA image data and a full set of features extracted from a probability map generated by the trained second stage classifier.

In an advantageous embodiment, two vessel orientation tensor classifiers can be trained: a small scale vessel orientation tensor classifier and a large scale vessel orientation tensor classifier based training examples sampled for small and large scale coronary arteries, respectively. The small scale vessel orientation tensor classifier and the large scale vessel orientation tensor classifier are each trained to assign high probabilities to samples oriented along vessel direction at coronary voxels, and low probabilities to samples that have either false orientation or fall outside coronary lumen. In an exemplary implementation, each of the small and large scale vessel orientation tensor classifiers can be trained using cascaded PBTs, as described above. Each of the discrete orientations at each voxel can be processed by both the small scale vessel orientation tensor classifier and the large scale vessel orientation tensor classifier, resulting in a small scale classification score and a large scale classification score for each sample (i.e., each discrete orientation at each voxel). The maximum of the small scale classification score and the large scale classification score for each voxel for each sample is then used as the final classification score for that sample.

At step 1108, a vessel orientation tensor at each voxel is calculated based on the classification scores of the plurality of discrete orientations at that voxel. In an advantageous embodiment, in order to compute the vessel orientation tensor at a particular voxel, the classification scores calculated for each of the plurality of discrete directions are used to scale corresponding unit orientation vectors for the plurality of discrete direction and their symmetric directions. Suppose that $s_1, s_2, \ldots, s_{13}$ are estimated classification scores for unit orientation vectors $\vec{d}_1, \vec{d}_2, \ldots, \vec{d}_{13}$, respectively, at a given voxel. The classification scores $s_1, s_2, s_{13}$ is used to scale the respective unit orientations vectors $\vec{d}_1, \vec{d}_2, \ldots, \vec{d}_{13}$ and their respective symmetric directions $-\vec{d}_1, -\vec{d}_2, \ldots, -\vec{d}_{13}$. All of the scaled vector samples $\vec{d}_1 s_1, \vec{d}_2 s_2, \ldots, \vec{d}_{13} s_{13}$ and their symmetric directions $-\vec{d}_1 s_1, -\vec{d}_2 s_2, \ldots, -\vec{d}_{13} s_{13}$ can be represented as three dimensional points. The vessel orientation tensor can then be defined as the covariance matrix of these three dimensional points.

Although a covariance based approach can be used to obtain a tensor representation of the local orientation at each voxel based on the classification scores for the discrete orientations, as described above, the present invention is not limited thereto, and it is possible to form the tensor matrix via other approaches as well. In an alternative embodiment, the local orientation tensor at a particular voxel can be estimated by fitting an ellipsoid model to calculated classification scores of the plurality of discrete orientations. In another alternative embodiment, techniques similar to those used in magnetic resonance (MR) diffusion tensor imaging (DT) can be used to estimate the local orientation tensors. In DTI, an anisotropic diffusion tensor is constructed from measurements of restricted water diffusion along six or more three-dimensional orientations. In a possible implementation, the calculated classification scores for the discrete orientations can be treated similarly to DTI diffusion measurements, and methods for computing the diffusion tensor from diffusion measurements can be similarly applied to compute the vessel orientation tensor from calculated classification scores of the discrete orientations.

Figure 12:
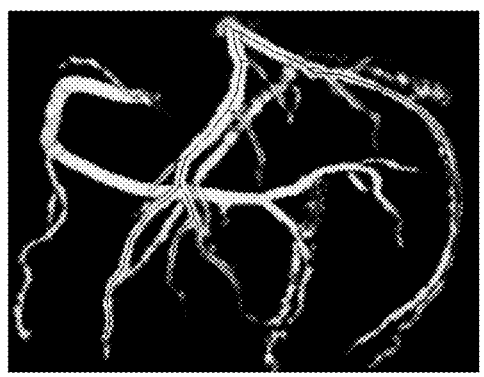
FIG. 12 illustrates exemplary results of estimating vessel orientation tensors of a coronary artery in a CTA image.
Figure 12:
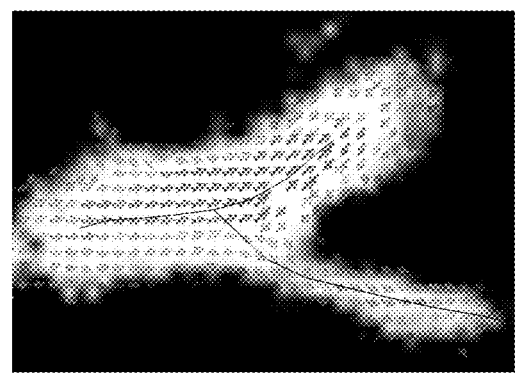

At step 1110, the estimated vessel orientation tensors are output. The estimated vessel orientation tensors can be output by displaying the estimated vessel orientation tensors estimated for the coronary voxels on a display device of a computer system. For example, a visualization of the detected coronary voxels can be displayed with arrows representing the direction of the estimated vessel orientation tensors of the voxels. In an exemplary implementation, the color of the displayed arrows can indicate the tensor magnitudes (e.g., first principal component or norm). FIG. 12 illustrates exemplary results of estimating vessel orientation tensors of a coronary artery in a CTA image. As shown in FIG. 12, image 1200 shows a 3D visualization of detected coronary voxels overlaid with an annotated left coronary artery (LCA) tree. Image 1210 shows an MPR view of a portion of the LCA overlaid with the principal component of detected vessel orientation tensors. It can be noted that since the vessel orientation is a symmetric measure, the orientation the arrows in image 1210 indicates the local vessel orientations but the specific direction the arrows are pointing can be ignored. That is, arrows pointing in symmetric/opposite directions along the same orientation can be considered to be equivalent.

The estimated vessel orientation tensors can also be output by storing, on a storage or memory of a computer system, the estimated vessel orientation tensor for each of the detected coronary voxels. The estimated vessel orientation tensors generated in FIG. 11 can be utilized in various other applications. For example, the predicted orientation tensors can be utilized to guide centerline tracing methods to prevent shortcuts by penalizing tracing towards lumen wall. The predicted orientations can also be utilized to learn more reliable vesselness or medialness models that can deal with vessels of different orientations by aligning underlying models with tensor's major principal components. The predicted orientation tensors can also be utilized to highlight the coronaries and suppress their background by computing a vesselness score based on the tensor's magnitude, i.e., its first principal component or norm.

In an advantageous embodiment, the estimated vessel orientation tensors can be used in a method for coronary artery (or other vessel) centerline extraction that detects coronary artery centerlines by finding optimal paths in computational flow fields. This centerline extraction uses an analogy of fluid flowing from regions of high pressure by setting up a fluid flow problem where the coronary ostia are specified as a high pressure region. For each coronary tree, an incompressible inviscid steady state porous media flow is computed inside the detected vesselness mask with boundary conditions on pressure. The flow computation treats the mask voxels as a porous material with a voxel permeability. In this context, the permeability can be understood as an inverse resistance to flow in the voxel. The principal directions of the tensor and its eigenvalues relate the ease of flowing along each direction in the voxel, giving a local anisotropic structure. The voxels in the vicinity (e.g., 5 mm) of the ostium points are considered as inlet points with high permeability. However, outlet points corresponding to coronary distal points are not known a priori unless provided by an operator or another algorithm. Therefore, all voxels along the mask are considered as outlet points with low permeability, or equivalently, high resistance to ensure that most of the flow stays within the vascular structures. The pressure is forced to be unit for inlet voxels and zero outside the mask. Instead of a fixed uniform isotropic permeability, the estimated coronary orientation tensors (obtained using the method of FIG. 11) are used as permeability tensors. The flow can be efficiently computed by solving a tensor weighted Laplacian model $\nabla \cdot (K \nabla p) = 0$, where K is the estimated vessel orientation tensor and p denotes pressure.

Using the estimated coronary orientation tensor as permeability has several advantages. Since the vessel orientation tensor is lower along directions that are not aligned with true coronary orientation, the computed flow is forced to be low between coronaries and touching structures. This makes this coronary centerline extraction approach robust to leaking into adjacent structures. Further, the magnitude of the vessel orientation tensor is higher in the coronary center and gradually decreases towards background. Therefore, the velocities in the computed flow vary from low at the walls and background to a maximum along the coronary center, which makes it more suitable to be used for centerline tracing. In addition, anisotropy of the vessel orientation tensors yield natural flow fields in bifurcation regions for which common centerline metrics are not well-defined.

The centerline can be extracted from ostia to a location inside the coronary mask based on the path that carries the maximum flow. Let G=(V,E) be a directed graph with vertices V corresponding to image voxels and directed edges E connecting vertices from high pressure to low pressure. Each edge is assigned a weight based on the cross-sectional flow rates computed along that edge. The maximum flow path between two vertices in this directed graph can be computed by finding the widest path which maximizes the weight of the minimum weight edge along the path. Single source widest path in a directed graph can be solve efficiently by a modified Dijkstra's algorithm if the edge weights are sorted, which is satisfied by this graph because of conservation of flow rates. To obtain the centerline tree, the method considers the widest paths to all vertices in the graph are iteratively selects the path that has a maximum flow volume, i.e., the integral of the flow rate along the path. Paths that are below a saliency measure defined as a length-scale ratio are pruned away.

Figure 13:
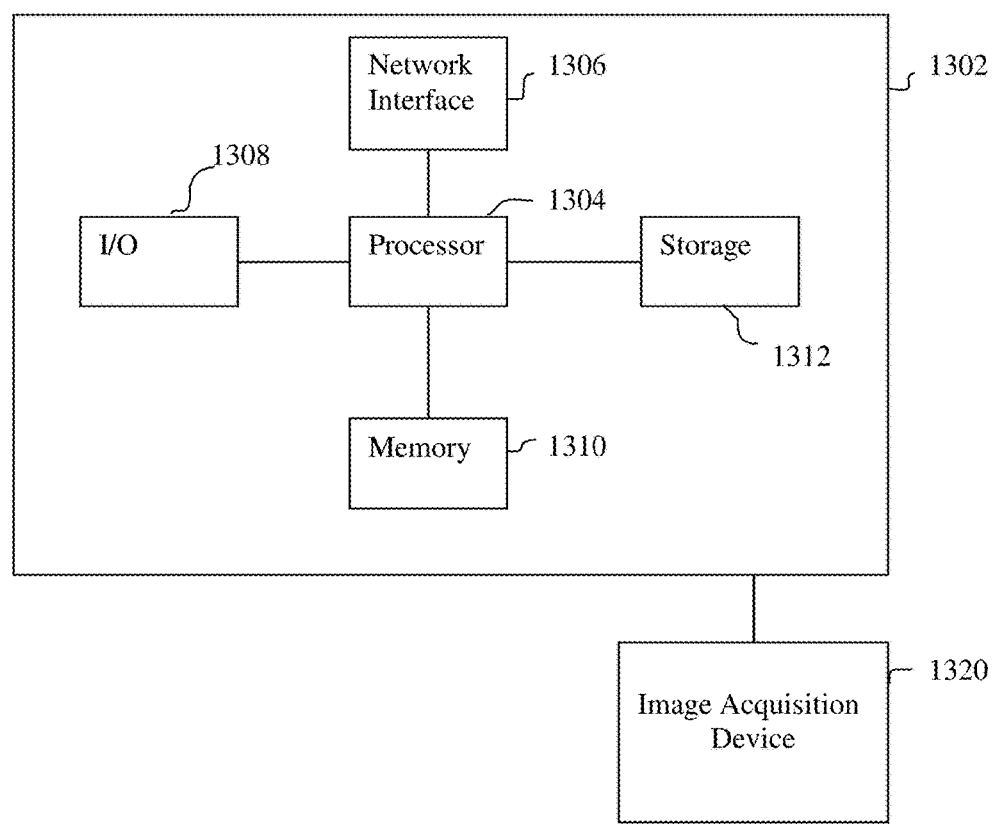
FIG. 13 is a high-level block diagram of a computer capable of implementing the present invention.

The above-described methods for machine learning based vesselness detection, machine learning based vessel orientation tensor estimation, and vessel centerline extraction may be implemented on a computer using well-known computer processors, memory units, storage devices, computer software, and other components. A high-level block diagram of such a computer is illustrated in FIG. 13.

Computer 1302 contains a processor 1304, which controls the overall operation of the computer 1302 by executing computer program instructions which define such operation. The computer program instructions may be stored in a storage device 1312 (e.g., magnetic disk) and loaded into memory 1310 when execution of the computer program instructions is desired. Thus, the steps of the methods of FIGS. 1, 8, and 11 may be defined by the computer program instructions stored in the memory 1310 and/or storage 1312 and controlled by the processor 1304 executing the computer program instructions. An image acquisition device 1320, such as a CT scanner, can be connected to the computer 1302 to input image data to the computer 1302. It is possible to implement the image acquisition device 1320 and the computer 1302 as one device. It is also possible that the image acquisition device 1320 and the computer 1302 communicate wirelessly through a network. In a possible embodiment, the computer 1302 can be located remotely with respect to the image acquisition device 1320 and the method steps described herein can be performed as part of a server or cloud based service. In this case, the method steps may be performed on a single computer or distributed between multiple networked computers. The computer 1302 also includes one or more network interfaces 1306 for communicating with other devices via a network. The computer 1302 also includes other input/output devices 1308 that enable user interaction with the computer 1302 (e.g., display, keyboard, mouse, speakers, buttons, etc.). Such input/output devices 1308 may be used in conjunction with a set of computer programs as an annotation tool to annotate volumes received from the image acquisition device 1320. One skilled in the art will recognize that an implementation of an actual computer could contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for machine learning based detection of vessel orientation tensors of a target vessel from a medical image of a patient, comprising:
    extracting features for each of a plurality of voxels in the medical image from sampling patches oriented to each of a plurality of discrete orientations;
    calculating a classification score for each of the plurality of discrete orientations at each of the plurality of voxels based on the features extracted from the sampling patches oriented to each of the plurality of discrete orientations using a trained vessel orientation tensor classifier; and
    calculating a vessel orientation tensor at each of the plurality of voxels in the medical image based on the classification scores of the plurality of discrete orientations at that voxel.

2. The method of claim 1, wherein the plurality of discrete orientations comprises a set of non-symmetric orientations defined by directions between each voxel and a set of neighboring voxels.

3. The method of claim 1, wherein calculating a vessel orientation tensor at each of the plurality of voxels in the medical image based on the classification scores of the plurality of discrete orientations at that voxel comprises, for each of the plurality of voxels:
scaling unit orientation vectors corresponding to the plurality of discrete orientations and symmetric directions to the plurality of discrete orientations using the classification scores of the plurality of discrete orientations at the voxel; and
calculating the vessel orientation tensor at the voxel as a covariance matric of the scaled unit orientation vectors.

4. The method of claim 1, wherein the trained vessel orientation tensor classifier is trained based on positive training examples sampled within a proximity of annotated vessel centerlines in training images, with each positive training example assigned one of the plurality of discrete orientations that makes a smallest angle with a true vessel orientation, and negative training examples sampled from inside a vessel lumen in the training images and assigned orientations from the plurality of discrete orientations that make an angle greater than a predetermined degree with the true vessel orientation, and sampled from a band around the vessel lumen with all of the plurality of discrete orientations.

5. The method of claim 1, wherein calculating a classification score for each of the plurality of discrete orientations at each of the plurality of voxels based on the features extracted from the sampling patches oriented to each of the plurality of discrete orientations using a trained vessel orientation tensor classifier comprises:
calculating a small scale classification score for each of the plurality of discrete orientations at each of the plurality of voxels based on the features extracted from the sampling patches oriented to each of the plurality of discrete orientations using a trained small scale vessel orientation tensor classifier;
calculating a large scale classification score for each of the plurality of discrete orientations at each of the plurality of voxels based on the features extracted from the sampling patches oriented to each of the plurality of discrete orientations using a trained large scale vessel orientation tensor classifier; and
selecting a maximum of the small scale classification score and the large scale classification score as the classification score for each of the plurality of discrete orientations at each of the plurality of voxels.

6. The method of claim 1, wherein the trained vessel orientation tensor classifier comprises a cascade of trained classifiers including a trained first stage classifier and a trained second stage classifier, and calculating a classification score for each of the plurality of discrete orientations at each of the plurality of voxels based on a first set of features extracted from the sampling patches oriented to each of the plurality of discrete orientations using a trained vessel orientation tensor classifier comprises, for each of the plurality of voxels:
classifying, by the trained first stage classifier, each of the plurality of discrete orientations at the voxel as positive or negative based on a first set of features extracted from the sampling patches oriented to each of the plurality of discrete orientations; and
calculating, by the trained second stage classifier, a classification score for each of the plurality of discrete orientations that are classified as positive by the trained first stage classifier based on a second set of features extracted from the sampling patches oriented to each of the plurality of discrete orientations that are classified as positive by the trained first stage classifier.

7. The method of claim 6, wherein the second set of features includes the first set of features and one or more additional features.

8. The method of claim 6, wherein the first set of features includes an anatomy context based geometric feature and a set of steerable features, and the second set of features includes the geometric anatomy context based geometric feature, the set of steerable features, Hessian based vesselness features, local intensity statistics, and gradient covariance based features.

9. The method of claim 6, wherein the trained vessel orientation tensor classifier further comprises a trained third stage classifier, and calculating a classification score for each of the plurality of discrete orientations at each of the plurality of voxels based on the features extracted from the sampling patches oriented to each of the plurality of discrete orientations using a trained vessel orientation tensor classifier further comprises, for each of the plurality of voxels:
calculating, by the trained third stage classifier, a classification score for each of the plurality of discrete orientations that are classified as positive by the trained first stage classifier based on a second set of features extracted from the sampling patches in the medical image oriented to each of the plurality of discrete orientations that are classified as positive by the trained first stage classifier and sampling patches in a probability map generated by the trained second stage classifier oriented to each of the plurality of discrete orientations that are classified as positive by the trained first stage classifier.

10. The method of claim 1, wherein extracting features for each of a plurality of voxels in the medical image from sampling patches oriented to each of a plurality of discrete orientations comprises:
extracting gradient covariance based features from sampling patches oriented to each of a plurality of discrete orientations at each of the plurality of voxels in the medical image.

11. The method of claim 1, further comprising:
extracting centerlines of the target vessel in the medical image based on a computational flow fields between the plurality of voxels in the medical image calculated using the vessel orientation tensors at the plurality of voxels.

12. An apparatus for machine learning based detection of vessel orientation tensors of a target vessel from a medical image of a patient, comprising:
a processor; and
a memory to store computer program instructions, the computer program instructions when executed on the processor cause the processor to perform operations comprising:
extracting features for each of a plurality of voxels in the medical image from sampling patches oriented to each of a plurality of discrete orientations;
calculating a classification score for each of the plurality of discrete orientations at each of the plurality of voxels based on the features extracted from the sampling patches oriented to each of the plurality of discrete orientations using a trained vessel orientation tensor classifier; and calculating a vessel orientation tensor at each of the plurality of voxels in the medical image based on the classification scores of the plurality of discrete orientations at that voxel.

13. The apparatus of claim 12, wherein the plurality of discrete orientations comprises a set of non-symmetric orientations defined by directions between each voxel and a set of neighboring voxels.

14. The apparatus of claim 12, wherein calculating a vessel orientation tensor at each of the plurality of voxels in the medical image based on the classification scores of the plurality of discrete orientations at that voxel comprises, for each of the plurality of voxels:
   scaling unit orientation vectors corresponding to the plurality of discrete orientations and symmetric directions to the plurality of discrete orientations using the classification scores of the plurality of discrete orientations at the voxel; and
   calculating the vessel orientation tensor at the voxel as a covariance matric of the scaled unit orientation vectors.

15. The apparatus of claim 12, wherein the trained vessel orientation tensor classifier is trained based on positive training examples sampled within a proximity of annotated vessel centerlines in training images, with each positive training example assigned one of the plurality of discrete orientations that makes a smallest angle with a true vessel orientation, and negative training examples sampled from inside a vessel lumen in the training images and assigned orientations from the plurality of discrete orientations that make an angle greater than a predetermined degree with the true vessel orientation, and sampled from a band around the vessel lumen with all of the plurality of discrete orientations.

16. The apparatus of claim 12, wherein calculating a classification score for each of the plurality of discrete orientations at each of the plurality of voxels based on the features extracted from the sampling patches oriented to each of the plurality of discrete orientations using a trained vessel orientation tensor classifier comprises:
   calculating a small scale classification score for each of the plurality of discrete orientations at each of the plurality of voxels based on the features extracted from the sampling patches oriented to each of the plurality of discrete orientations using a trained small scale vessel orientation tensor classifier;
   calculating a large scale classification score for each of the plurality of discrete orientations at each of the plurality of voxels based on the features extracted from the sampling patches oriented to each of the plurality of discrete orientations using a trained large scale vessel orientation tensor classifier; and
   selecting a maximum of the small scale classification score and the large scale classification score as the classification score for each of the plurality of discrete orientations at each of the plurality of voxels.

17. The apparatus of claim 12, wherein extracting features for each of a plurality of voxels in the medical image from sampling patches oriented to each of a plurality of discrete orientations comprises:
   extracting gradient covariance based features from sampling patches oriented to each of a plurality of discrete orientations at each of the plurality of voxels in the medical image.

18. The apparatus of claim 12, further comprising:
   extracting centerlines of the target vessel in the medical image based on a computational flow fields between the plurality of voxels in the medical image calculated using the vessel orientation tensors at the plurality of voxels.

19. A non-transitory computer readable medium storing computer program instructions for machine learning based detection of vessel orientation tensors of a target vessel from a medical image of a patient, the computer program instructions when executed by a processor cause the processor to perform operations comprising:
   extracting features for each of a plurality of voxels in the medical image from sampling patches oriented to each of a plurality of discrete orientations;
   calculating a classification score for each of the plurality of discrete orientations at each of the plurality of voxels based on the features extracted from the sampling patches oriented to each of the plurality of discrete orientations using a trained vessel orientation tensor classifier; and
   calculating a vessel orientation tensor at each of the plurality of voxels in the medical image based on the classification scores of the plurality of discrete orientations at that voxel.

20. The non-transitory computer readable medium of claim 19, wherein the plurality of discrete orientations comprises a set of non-symmetric orientations defined by directions between each voxel and a set of neighboring voxels.

21. The non-transitory computer readable medium of claim 19, wherein calculating a vessel orientation tensor at each of the plurality of voxels in the medical image based on the classification scores of the plurality of discrete orientations at that voxel comprises, for each of the plurality of voxels:
   scaling unit orientation vectors corresponding to the plurality of discrete orientations and symmetric directions to the plurality of discrete orientations using the classification scores of the plurality of discrete orientations at the voxel; and
   calculating the vessel orientation tensor at the voxel as a covariance matric of the scaled unit orientation vectors.

22. The non-transitory computer readable medium of claim 19, wherein the trained vessel orientation tensor classifier is trained based on positive training examples sampled within a proximity of annotated vessel centerlines in training images, with each positive training example assigned one of the plurality of discrete orientations that makes a smallest angle with a true vessel orientation, and negative training examples sampled from inside a vessel lumen in the training images and assigned orientations from the plurality of discrete orientations that make an angle greater than a predetermined degree with the true vessel orientation, and sampled from a band around the vessel lumen with all of the plurality of discrete orientations.

23. The non-transitory computer readable medium of claim 19, wherein calculating a classification score for each of the plurality of discrete orientations at each of the plurality of voxels based on the features extracted from the sampling patches oriented to each of the plurality of discrete orientations using a trained vessel orientation tensor classifier comprises:
   calculating a small scale classification score for each of the plurality of discrete orientations at each of the plurality of voxels based on the features extracted from the sampling patches oriented to each of the plurality of discrete orientations using a trained small scale vessel orientation tensor classifier;

calculating a large scale classification score for each of the plurality of discrete orientations at each of the plurality of voxels based on the features extracted from the sampling patches oriented to each of the plurality of discrete orientations using a trained large scale vessel orientation tensor classifier; and selecting a maximum of the small scale classification score and the large scale classification score as the classification score for each of the plurality of discrete orientations at each of the plurality of voxels.

24. The non-transitory computer readable medium of claim 19, wherein the trained vessel orientation tensor classifier comprises a cascade of trained classifiers including a trained first stage classifier and a trained second stage classifier, and calculating a classification score for each of the plurality of discrete orientations at each of the plurality of voxels based on a first set of features extracted from the sampling patches oriented to each of the plurality of discrete orientations using a trained vessel orientation tensor classifier comprises, for each of the plurality of voxels:

classifying, by the trained first stage classifier, each of the plurality of discrete orientations at the voxel as positive or negative based on a first set of features extracted from the sampling patches oriented to each of the plurality of discrete orientations; and calculating, by the trained second stage classifier, a classification score for each of the plurality of discrete orientations that are classified as positive by the trained first stage classifier based on a second set of features extracted from the sampling patches oriented to each of the plurality of discrete orientations that are classified as positive by the trained first stage classifier.

25. The non-transitory computer readable medium of claim 24, wherein the first set of features includes an anatomy context based geometric feature and a set of steerable features, and the second set of features includes the geometric anatomy context based geometric feature, the set of steerable features, Hessian based vesselness features, local intensity statistics, and gradient covariance based features.

26. The non-transitory computer readable medium of claim 24, wherein the trained vessel orientation tensor classifier further comprises a trained third stage classifier, and calculating a classification score for each of the plurality of discrete orientations at each of the plurality of voxels based on the features extracted from the sampling patches oriented to each of the plurality of discrete orientations using a trained vessel orientation tensor classifier further comprises, for each of the plurality of voxels:

calculating, by the trained third stage classifier, a classification score for each of the plurality of discrete orientations that are classified as positive by the trained first stage classifier based on a second set of features extracted from the sampling patches in the medical image oriented to each of the plurality of discrete orientations that are classified as positive by the trained first stage classifier and sampling patches in a probability map generated by the trained second stage classifier oriented to each of the plurality of discrete orientations that are classified as positive by the trained first stage classifier.

27. The non-transitory computer readable medium of claim 19, wherein extracting features for each of a plurality of voxels in the medical image from sampling patches oriented to each of a plurality of discrete orientations comprises:

extracting gradient covariance based features from sampling patches oriented to each of a plurality of discrete orientations at each of the plurality of voxels in the medical image.

28. The non-transitory computer readable medium of claim 19, wherein the operations further comprise:

extracting centerlines of the target vessel in the medical image based on a computational flow fields between the plurality of voxels in the medical image calculated using the vessel orientation tensors at the plurality of voxels.

* * * * *